UNITED STATES PATENT OFFICE.

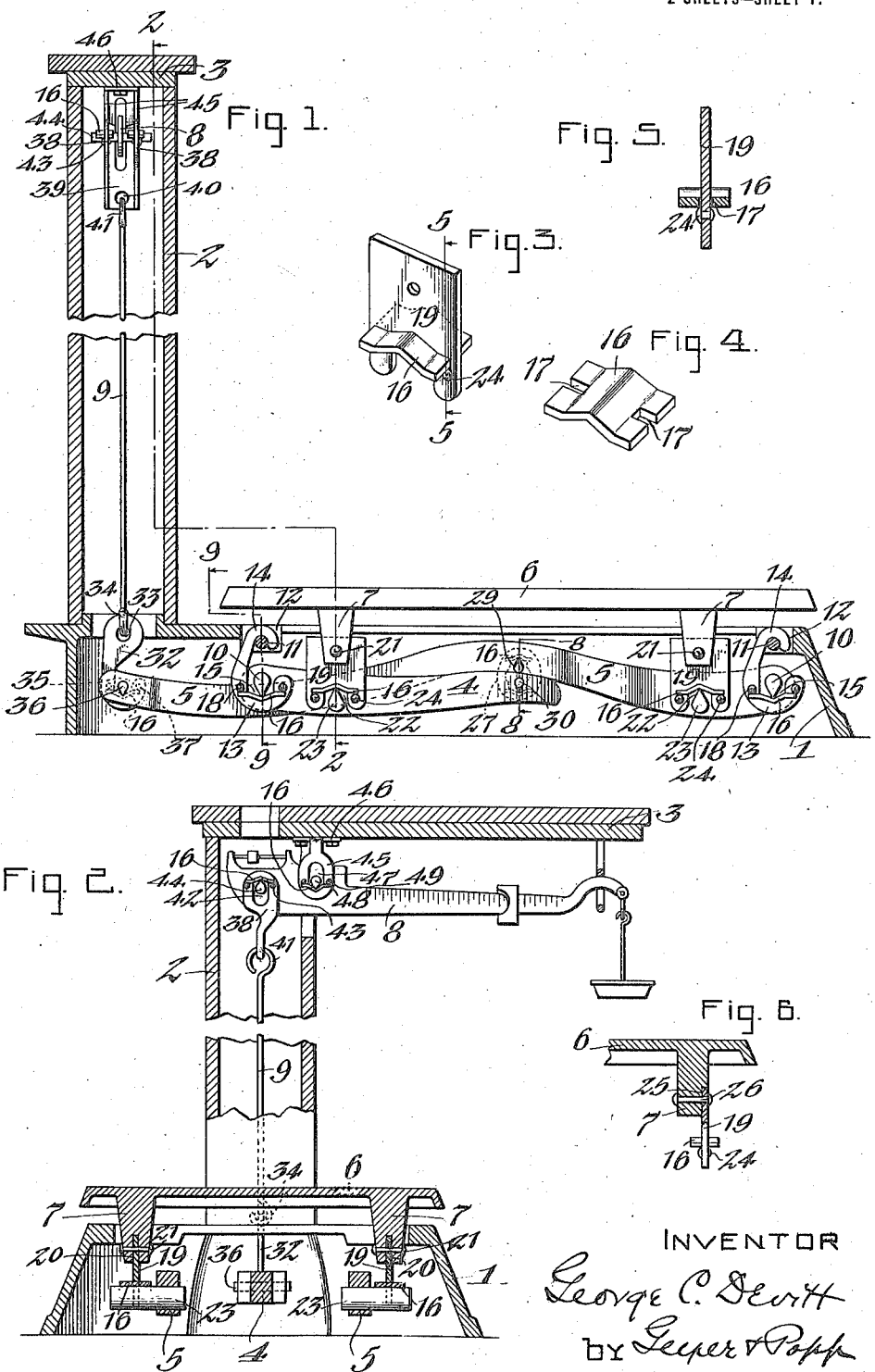
G. C. DEVITT.
BEARING FOR SCALES.
APPLICATION FILED JULY 24, 1916.
1,273,155.
Patented July 23, 1918.
2 SHEETS—SHEET 1.
INVENTOR
George C. Devitt
by Geyer & Popp
ATTORNEYS.

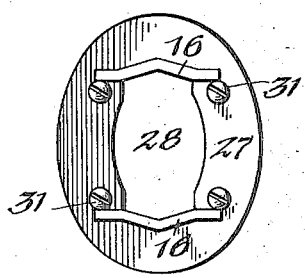
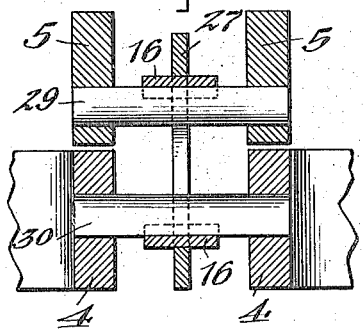
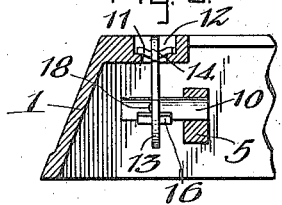
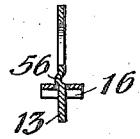
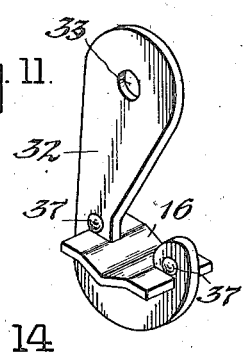
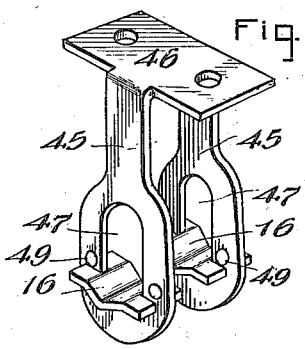
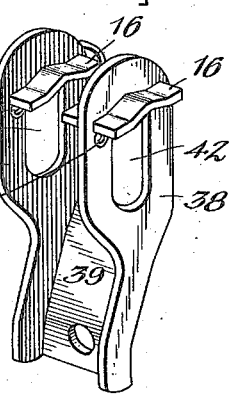
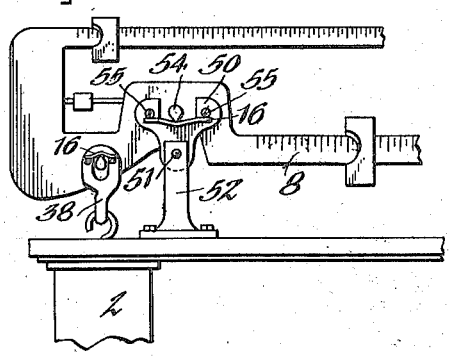

GEORGE C. DEVITT, OF BUFFALO, NEW YORK, ASSIGNOR TO BUFFALO SCALE COMPANY, OF BUFFALO, NEW YORK, A CORPORATION OF NEW YORK.

BEARING FOR SCALES.

1,273,155.

Specification of Letters Patent. Patented July 23, 1918.

Application filed July 24, 1916. Serial No. 110,899.

*To all whom it may concern:*

Be it known that I, GEORGE C. DEVITT, a citizen of the United States, residing at Buffalo, in the county of Erie and State of New York, have invented new and useful Improvements in Bearings for Scales, of which the following is a specification.

This invention relates to a bearing for scales and it has the object to provide a bearing of this character which may be used between various pivotally connected elements of a scale so as to obtain a maximum sensitiveness or accuracy in the operation of the scale at a minimum cost of manufacture.

In the accompanying drawings:

Figure 1 is a longitudinal section of a platform scale having its various pivotal connections between relatively movable members thereof provided with bearings embodying my improvements. Fig. 2 is a vertical transverse section of the scale taken on line 2—2, Fig. 1. Fig. 3 is a detached perspective view of one of the platform bearings. Fig. 4 is a detached perspective view of a bearing plate forming part of one of my improved bearings. Fig. 5 is a vertical section taken on line 5—5, Fig. 3. Fig. 6 is a fragmentary vertical transverse section showing a modified construction of the manner of mounting a platform bearing on the platform. Fig. 7 is a detached side elevation of the center bearing or coupling between the levers of the scale. Fig. 8 is a vertical transverse section, on an enlarged scale, taken on line 8—8, Fig. 1. Fig. 9 is a fragmentary vertical transverse section, on an enlarged scale, taken on line 9—9, Fig. 1. Fig. 10 is a vertical section of a bearing showing a modification in the manner of retaining the bearing plate on the bearing head. Fig. 11 is a perspective view of the bearing forming part of the pivotal connection between the lower end of the pillar or steel yard rod and the short lever of the scale. Fig. 12 is a similar view of a bearing embodying my invention and mounted on a hanger for supporting the beam. Fig. 13 is a similar view showing my improvements applied to the pivotal connection between the upper end of the pillar or steel yard rod and the beam. Fig. 14 is a fragmentary side elevation showing a modification of the manner of pivotally mounting the beam by means of my invention.

Similar characters of reference indicate corresponding parts throughout the several views.

Referring to Figs. 1 and 2, 1 represents a hollow base or frame, 2 a hollow column or pillar rising from one end of the base, 3 a cap projecting laterally from the upper end of the column, 4 a bifurcated short lever arranged lengthwise in the base and pivotally mounted thereon, 5 a bifurcated long lever also pivotally mounted on the base and pivotally connected with the short lever, 6 a platform arranged above the opening in the base and provided with downwardly projecting legs 7 which are pivotally mounted on the short and long levers, a beam 8 arranged underneath the cap and pivotally supported thereon and also projecting at its inner end into the hollow column, and a pillar or steel yard rod 9 arranged vertically within the pillar or column and pivotally connected at its upper and lower ends with the beam and the short lever respectively.

The foregoing parts comprise the main elements of an ordinary platform scale which are adapted to be pivotally connected by means which embody my improvements but it is to be understood that my invention is also applicable to other forms of scales. Each of the pivotal connections between the levers of the scale and the base thereof is constructed as follows:

10 represents laterally projecting platform pivot pins arranged on the scale levers and having a downwardly tapering knife edge and 11 represents horizontal supporting pins resting in sockets 12 on the base immediately above the lever pins 10, as shown in Figs. 1 and 9. These pivotal connections between the levers and the base are usually arranged at the corners of the latter. Each lever of these bearings preferably comprises a loop-shaped head 13 which is provided at its upper end with a hook 14 engaging over the upper side of the respective supporting pin 11 while its lower end is provided with a slot 15 which terminates short of the lower end of this loop-shaped head. 16 represents a bearing plate which is arranged in the slot of the head 13 and rests with its under or rear side against the bottom of this slot, while its upper or front side is engaged by the lower or knife edge of the companion pivot pin 10. The central part of this bearing plate is preferably constructed of V-shaped form and the lower end of the slot in the loop head is of corresponding shape so as to fit this part of the bearing plate, and the companion pivot pin 10 engages its knife edge with the bottom or lowermost part of the V-shaped surface on the front side of this bearing plate, thereby centering these parts relatively to each other and retaining them in place. The bearing plate is confined against displacement in the direction of the axis of the companion pivot pin 10 by providing opposite ends of this plate with notches 17, 17 into which the adjacent side parts or pieces of the loop head project. The bearing plate is prevented from rising in its loop head by means of stops 18 which preferably consists of rivets secured to the side pieces of the loop head above the ends of the bearing plate, as shown in Fig. 1, thereby confining the bearing plate on its head.

The loop head and the bearing plate are each constructed from a single piece of sheet metal, preferably steel, by stamping the same into the desired shape, thereby enabling these parts to be produced uniformly and expeditiously and at very low cost compared with the devices which have heretofore been used for this purpose.

When applying my invention to the corner bearings between the platform and the scale levers the same may be constructed as follows:

19 represents a plurality of corner heads each of which, as shown in Figs. 1 and 2, may be secured at its upper end in a slot or seat 20 at the lower end of one of the platform legs by means of a horizontal rivet 21 while its lower end is provided with a downwardly opening slot 22. Arranged in the slot of the platform head is a bearing plate 16 which rests with its upper or rear side against the bottom of the slot 22 while its lower or front side is engaged by the upper knife-shaped edge of a platform pivot pin 23 arranged on the adjacent part of the respective lever. The central part of this bearing plate is also of V-shaped form for centering the companion pivot pin thereon. The opposite ends of this plate are provided with notches into which the adjacent side pieces of the platform head project and this plate is confined in the slot of the platform head by means of stops 24 consisting of rivets applied to the side pieces of this head below the end of the respective plate, as shown in Fig. 1.

Instead of securing the upper end of each platform head in a slot formed in the leg of the platform, as shown in Fig. 2, substantially the same result may be obtained by securing the upper end of each platform head in a rabbet 25 on one side of a platform leg by means of a rivet 26, as shown in Fig. 6.

When applying my invention to the pivotal connection between the short and long levers of the scale the same may be organized as follows:

27 represents a ring-shaped head constructed from sheet metal and provided with a slot 28. In this slot are arranged two bearing plates 16 which engage their outer or rear sides against opposite ends of this slot. The central parts of these last mentioned bearing plates are of V-shaped form and engage their inner opposing sides with the outer knife edges of pivot pins 29, 30 arranged on the adjacent overlying parts of the scale levers, as shown in Figs. 1 and 8. The opposite ends of each of the bearing plates 16 in Figs. 7 and 8 are provided with recesses or notches which receive the adjacent side plates of the ring-shaped supporting head and each of these bearing plates is retained against displacement on the ring-shaped head by means of stops consisting in this case of screws 31 which engage with openings formed in the ring-shaped head on the front sides of the respective bearing plates.

The pivotal connection between the lower end of the steel yard rod and the long lever of the scale also embodies my improved bearing and as shown in Figs. 1 and 11 the same in its preferred construction comprises a hook-shaped head 32 constructed of sheet metal and provided at its upper end with an eye 33 adapted to receive a hook 34 at the lower end of the steel yard rod while its lower end is pivoted with an upwardly opening slot 35, a bearing plate 16 arranged in this slot and resting with its underside against the bottom thereof while its upper or front side engages with the underside of a pivot pin 36 on the adjacent end of the long lever. This bearing plate is provided at its opposite ends with notches or recesses which receive the adjacent side parts of the hook-shaped head, and the latter has its side parts provided with stops 37 constructed in the form of rivets arranged above the ends of the respective bearing plate so as to confine the latter on the hook-shaped head.

The pivotal connection between the upper end of the steel yard rod and the beam embodies my invention and as shown in Figs. 1, 2 and 13 this connection comprises a bifurcated head which has two sections 38, 38 connected by a web 39 the latter being provided with an opening 40 receiving a hook 41 at the upper end of a steel yard rod. Each of these head sections 38 is provided with a vertical slot 42 the upper end of which is engaged by the upper side of a bearing plate 16. The latter has its opposite ends notched to receive the adjacent side parts of the respective head section and is confined on the same by means of stops 43 arranged on this head section and engaging with the underside of the respective bearing plate at opposite ends thereof. The two bearing plates mounted on the sections 38 of the supporting head shown in Figs. 1, 2 and 13 are arranged transversely and horizontally in line with each other and engage with opposite ends of a pivot pin 44 mounted on the inner end of the scale beam, the head sections 38 straddling this beam, and the pin 44 having its ends projecting from opposite sides of this beam.

For supporting the scale beam from the underside of the cap the pivotal connection embodying my improvement may be organized, as shown in Figs. 2 and 12 and as there shown the supporting head is constructed in the form of a hanger and comprises two sections 45, 45, which are connected at their upper ends by means of a base plate 46 secured to the underside of the platform cap while the lower parts of these sections straddle the scale beam. Each of these sections 45 is provided with a vertical slot 47 against the lower end of which is seated the underside of a bearing plate 16, the upper side of this plate being engaged by the underside of the adjacent end of the fulcrum pivot pin 48 of the scale beam. Each of the bearing plates 16, in Fig. 12 has its opposite ends provided with notches into which the adjacent parts of the head sections 48 project and this plate is confined in this slot by means of stops 49 arranged on the head sections 45 above the end portions of this bearing plate, as shown in Figs. 2 and 12.

Instead of pivotally mounting this scale beam on the underside of the scale cap the same may be mounted on the upper side of the latter, as shown in Fig. 14. When mounted, as shown in the last mentioned figure the pivotal connection between the scale beam and the scale cap preferably comprises a supporting head 50 secured at its lower end by means of a rivet 51 to a standard 52 projecting upwardly from the scale cap, a bearing plate 16 arranged in an upwardly opening slot or recess 53 in the head 50 and engaging against the lower end of this slot or recess while the upper side of this bearing plate is engaged by the underside of a fulcrum pivot pin 54 on the scale beam. The opposite ends of the bearing plate in this construction are notched to receive the adjacent parts of the bearing head 50 similar to the constructions heretofore described and this bearing plate is confined against vertical displacement in its companion head by means of stops 55 arranged on the respective head above the end portions of this bearing plate.

If desired the stops instead of being removably mounted on the supporting heads may be permanently mounted thereon, as shown at 56 in Fig. 10 and at 49 in Fig. 12 in which constructions these stops are made by laterally displacing, offsetting or striking up the metal so as to form integral stops or obstructions which prevent the bearing plates from becoming detached from the supporting heads.

In all of the several constructions shown and described the head and bearing plate are each constructed of a stamping made from sheet steel or similar metal which can be produced at comparatively low cost and at the same time is strong, light and durable and can be easily assembled as well as taken apart when this becomes necessary for adjustment, inspection or repairs.

I claim as my invention:

1. A bearing for scales comprising a supporting head provided with a slot, a bearing plate having its center provided on one side with a bearing face and resting on its opposite side against the end of said slot and provided at its opposite ends with notches into which the adjacent sides of the head project and stops projecting laterally from said head in front of said bearing plate and operating to hold the latter in said head.

2. A bearing for scales comprising a supporting head provided with a slot, and a bearing plate arranged in said slot and having its central part bent into substantially V-shape and forming on its front side a bearing face while its rear side engages the end of said slot and having its opposite ends arranged in the same plane and at an angle to the V-shaped central part and provided with notches into which the adjacent sides of said head project.

3. A bearing for scales comprising a supporting head provided with a slot, a bearing plate arranged in said slot and having its central part bent into substantially V-shape and forming on its front side a bearing face while its rear side engages the end of said slot and having its opposite ends provided with notches into which the adjacent sides of said head project, and stops which are formed integrally on said head in front of said bearing plate by displacing the metal of said head laterally therefrom so that the same engages with the front side of said plate and retains the latter in said plate.

GEORGE C. DEVITT.